United States Patent [19]
Hlavinka et al.

[11] Patent Number: 5,520,218
[45] Date of Patent: May 28, 1996

[54] MEDICAL TUBING SET FOR THE USE WITH AN IMPROVED RADIO FREQUENCY TUBING SEALER

[75] Inventors: Dennis J. Hlavinka, Golden; Frank Corbin, III, Littleton; Robert L. White, Kittridge, all of Colo.

[73] Assignee: Cobe Laboratories, Inc., Lakewood, Colo.

[21] Appl. No.: 257,653

[22] Filed: Jun. 9, 1994

Related U.S. Application Data

[60] Division of Ser. No. 21,507, Feb. 23, 1993, Pat. No. 5,345,070, which is a continuation-in-part of Ser. No. 952,951, Sep. 25, 1992, abandoned.

[51] Int. Cl.$^6$ .................................................. F16L 55/10
[52] U.S. Cl. .......................... 138/89; 138/104; 138/137; 138/178; 219/769; 156/272.2
[58] Field of Search .......................... 138/89, 103, 104, 138/137, 140, 178; 219/10.53, 10.81, 10.67, 10.73, 10.75, 765, 769, 777; 156/272.2, 273.7, 274.4, 274.6, 275.1, 380.6, 380.7, 380.3, 380.4, 380.5, 380.2, 380.8

[56] References Cited

U.S. PATENT DOCUMENTS

| | | |
|---|---|---|
| 2,638,963 | 5/1953 | Frederick et al. . |
| 2,667,437 | 1/1954 | Zoubek . |
| 2,816,596 | 12/1957 | Welch . |
| 2,941,575 | 6/1960 | Malmberg et al. . |
| 3,126,307 | 3/1964 | Drittenbass . |
| 3,276,447 | 10/1966 | Hamilton ................................. 138/89 |
| 3,534,777 | 10/1967 | Loof ....................................... 138/104 |
| 3,913,207 | 10/1975 | Frey ......................................... 138/89 |
| 3,963,055 | 6/1976 | DeRosa .................................... 138/89 |
| 3,968,000 | 7/1976 | Carroll et al. ........................... 138/89 |
| 4,013,860 | 3/1977 | Hosterman et al. . |
| 4,059,478 | 11/1977 | Hoffman . |
| 4,135,957 | 1/1979 | Voller . |
| 4,186,292 | 1/1980 | Acker . |
| 4,210,479 | 7/1980 | Fabisiewicz . |
| 4,268,338 | 5/1981 | Peterson . |
| 4,490,598 | 12/1984 | Minney et al. . |
| 4,496,819 | 1/1985 | Acker et al. . |
| 4,529,859 | 7/1985 | Minney et al. . |
| 4,628,168 | 9/1986 | Nebergall et al. . |
| 4,857,129 | 8/1989 | Jensen et al. . |
| 4,950,347 | 8/1990 | Futagawa . |
| 4,954,678 | 9/1990 | Harmony et al. . |
| 5,093,546 | 3/1992 | Matsumiya et al. . |
| 5,280,809 | 1/1994 | Tivo .......................................... 138/89 |
| 5,306,377 | 4/1994 | Jensen et al. . |
| 5,349,166 | 9/1994 | Taylor . |
| 5,360,330 | 11/1994 | Jensen et al. . |

FOREIGN PATENT DOCUMENTS

| | | |
|---|---|---|
| 1018525 | 10/1952 | France . |
| 1167682 | 8/1958 | France . |
| 1158577 | 11/1959 | France . |
| 1515148 | 1/1968 | France . |
| 51-28236 | 10/1976 | Japan . |
| 793036 | 4/1958 | United Kingdom . |
| 797202 | 6/1958 | United Kingdom . |

OTHER PUBLICATIONS

Engineering & Research Associates, Inc., "Sebra Operating Instructions Sebra Model 2380 Hand Held Tube Sealing System," Mar. 28, 1991, pp. 1–20, Tucson, AZ.

*Primary Examiner*—James E. Bryant, III
*Attorney, Agent, or Firm*—Bruce R. Winsor

[57] ABSTRACT

A tubing set includes at least one fluid conveying tube. The fluid conveying tube has a predetermined outside diameter, and is formed of a material adapted to be dielectrically heated at a sealing location. The insulating sleeve has an inside dimension at least as large as the outside diameter of the fluid conveying tube. The tubular insulating sleeve is positioned in a substantially coaxial relationship with the fluid conveying tube at the sealing location, and has a wall with thickness which insulates the fluid conveying tube to permit sealing the fluid conveying tube, and forming a thin, easily tearable web, by the application of the radio frequency dielectric heating.

24 Claims, 2 Drawing Sheets

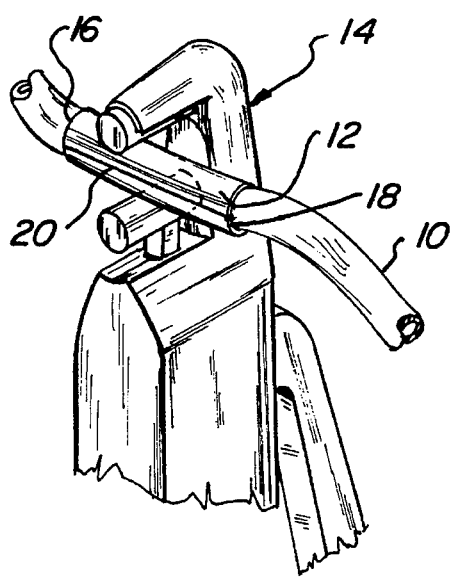
Fig_1
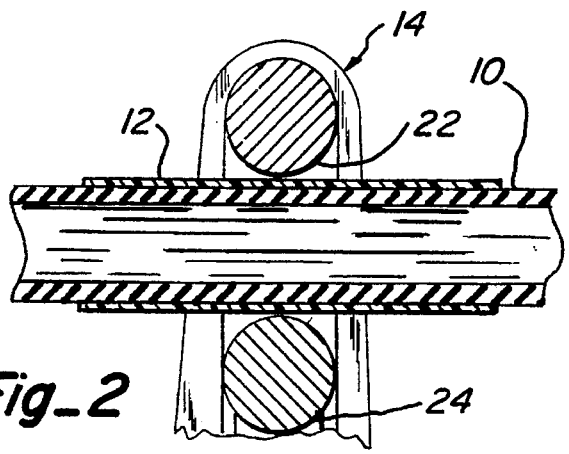
Fig_2
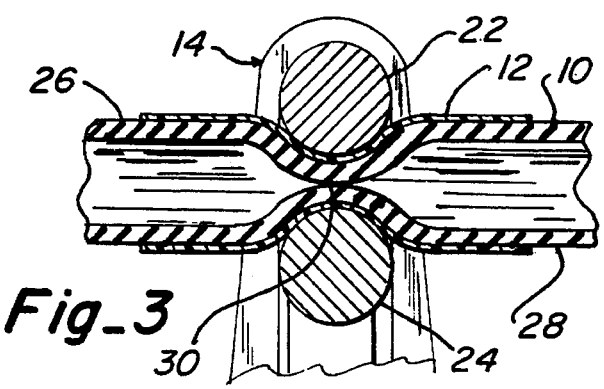
Fig_3
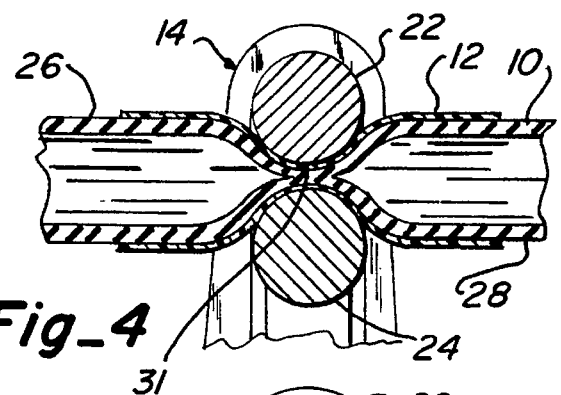
Fig_4
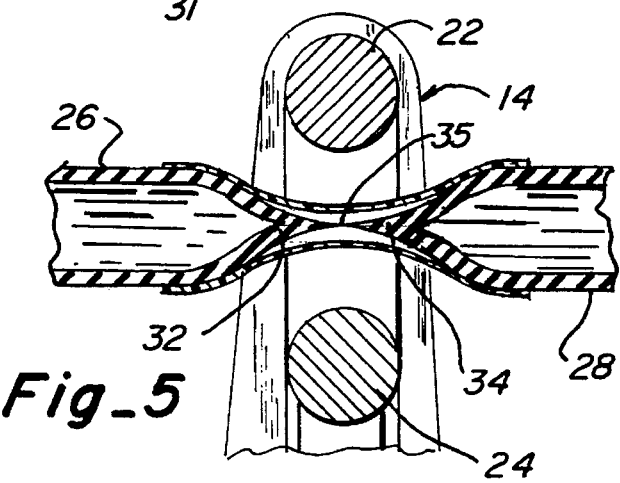
Fig_5
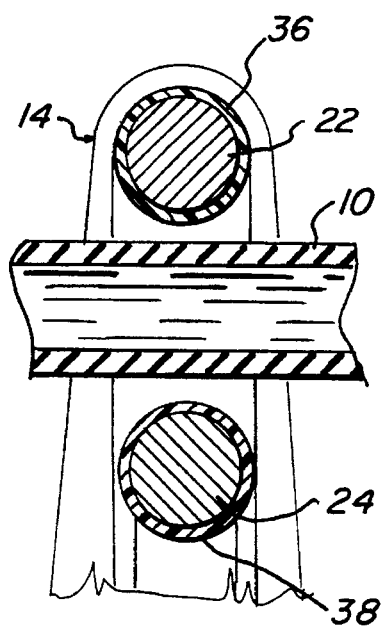
Fig_6

MEDICAL TUBING SET FOR THE USE WITH AN IMPROVED RADIO FREQUENCY TUBING SEALER

RELATED APPLICATIONS

This application is a divisional application of U.S. patent application Ser. No. 08/021,507, filed Feb. 23, 1993, now U.S. Pat. No. 5,345,070, which is a continuation-in-part of U.S. patent application Ser. No. 07/952,951, filed Sep. 25, 1992, now abandoned.

FIELD OF THE INVENTION

This invention relates to the sealing of radio frequency excitable thermoplastic tubing.

THE BACKGROUND OF THE INVENTION

It is well known that various thermoplastic materials having high dielectric loss coefficients may be melted by the application of radio frequency (RF) electric fields which excite and dielectrically heat the thermoplastic materials. This principle has been successfully applied to sealing plastic tubing. For example, the principle has been used to seal flexible plastic tubing containing medical or biological fluids used with medical apparatus and in the collection of blood from blood donors.

U.S. Pat. No. 4,013,860, issued Mar. 22, 1977 to Hosterman et al. for a "Hand Held Electro-Mechanism Sealer" describes an example of a hand held tubing sealer. The Hosterman tubing sealer compresses a flexible plastic medical tube between two jaws. RF energy is applied to the jaws, creating an electrical field. The electrical field excites and dielectrically heats the plastic tube compressed between the jaws, partially melting the plastic material of the tubing. The partially melted material welds together to form a hermetic fluid-tight seal. The fluid-tight seal divides the tube into two segments and prevents fluid communication between the two segments. The segments are physically connected by a thick web of plastic.

The Hosterman sealer has been advantageously used to facilitate the collection, transfer, and processing of blood from blood donors, and has further been used with the collection of separated blood components using a medical apparatus such as the blood component separation equipment manufactured by a subsidiary of the assignee of the present invention.

It is recognized as desirable under some circumstances to seal a plastic medical tube and divide it into two non-communicating segments without physically separating the segments from each other. It is further recognized as desirable under other circumstances to seal the tube dividing it into two non-communicating segments and physically separate the segments from each other. Although tubing sealers such as the Hosterman tubing sealer have been successfully used to seal plastic medical tubing, they have not generally been adaptable to sealing the tubing in a manner that facilitates separating the segments from each other. In those circumstances where the tube is to be sealed and separated it is often necessary to manually tear the two segments of the tube from each other. The thick web of plastic left by the Hosterman device may be difficult to tear. Furthermore, it is possible to inadvertently tear a segment of the tube instead of the web, impairing the sterility of the fluid in the tube and potentially exposing the operator to contact with the fluid which may be infectious or otherwise hazardous.

Alternatively the two segments may be cut from each other using a knife or scissors. The use of the knife or scissors increases the time required. Furthermore, the knife or scissors must be used with great care to avoid cutting into the seal, thereby impairing the sterility of the fluid, and potentially exposing the operator to contact with the fluid. Furthermore, when a knife or scissors cuts into the seal the knife or scissors may become contaminated, making it hazardous to use the knife or scissors for any purpose until it is cleaned or sterilized.

Although tubing sealers such as the Hosterman tubing sealer are highly reliable and safe, occasionally a seal made in a tube will fail during a sealing operation, potentially exposing the operator to contact with the fluid in the tube.

It has been proposed to provide ridges or other protrusions on the jaws of a tubing sealer to emboss the thick web creating a thinner area. In practice it has been found that such embossing jaws do not reliably produce an easily tearable web between the segments of the tube.

A thermoplastic material welding device which incorporates an electrode covering material is illustrated in Great Britain patent specification 797,202 published Jun. 25, 1958 on an application by Rado entitled "Radio Frequency Heating Electrodes"

It is against this background that the significant improvements and advancements of the present invention in the field of sealing plastic tubing have evolved.

SUMMARY OF THE INVENTION

A contributing reason for the inability of the prior art RF tubing sealers to create a web thin enough for easy manual separation of the sealed segments of the tube from each other is that insufficient heat is retained in the thermoplastic of the tube to sufficiently melt through the tube. At least a portion of this heat is transmitted from the tube back to the jaws of the tubing sealer.

One aspect of the present invention is an insulating sleeve installed on the outside of a thermoplastic tube to permit sealing the tube while selectively leaving a thick or a thin web. In accordance with this aspect of the invention, an insulating sleeve is installed around the outside of the tube to be cut. The tubing sealer is then used to compress and heat the tube at the location of the insulating sleeve. The insulating sleeve causes the plastic in the tube to retain sufficient heat to both seal the tube, dividing it into two segments which are not in fluid communication and to create a thin, easily torn, web between the sealed segments. Further in accordance with this aspect of the invention, the tube may be sealed and a thick web created between the segments by using the tubing sealer at a location separate from the location of the insulating sleeve. Still further in accordance with this aspect of the invention, a plurality of the insulating sleeves may be coded to indicate a predetermined sequence or locations of sealing and separating a plurality of tubes, such as by use of color coding, alphabetical sequence coding or numerical sequence coding imprinted on the tubular insulating sleeves. Also in accordance with this aspect of the invention the insulating sleeve diverts fluid from contact with the face or other exposed part of an operator in the event of a failure of a seal.

Another significant aspect of the present invention is a tubing set for a medical device which has at least one insulating sleeve installed on a medical tube of the tubing set at a desired sealing location.

A more complete appreciation of the present invention can be obtained from understanding the accompanying drawings, which are summarized briefly below, the following detailed description of a presently preferred embodiment of the invention, and the appended claims.

BRIEF DESCRIPTION OF THE DRAWINGS

FIG. 1 is a perspective view of a tubing sealer being used with the insulating sleeve of the present invention to seal a fluid conveying tube.

FIGS. 2–5 are a series of sectional views illustrating the use of the insulating sleeve of the present invention with a tubing sealer to selectively seal a tube and create a thin easily tearable web in accordance with the present invention.

FIG. 6 is a sectional view illustrating an alternative embodiment of the insulating sleeves of the present invention.

DETAILED DESCRIPTION OF THE PREFERRED EMBODIMENT

Figure 7:
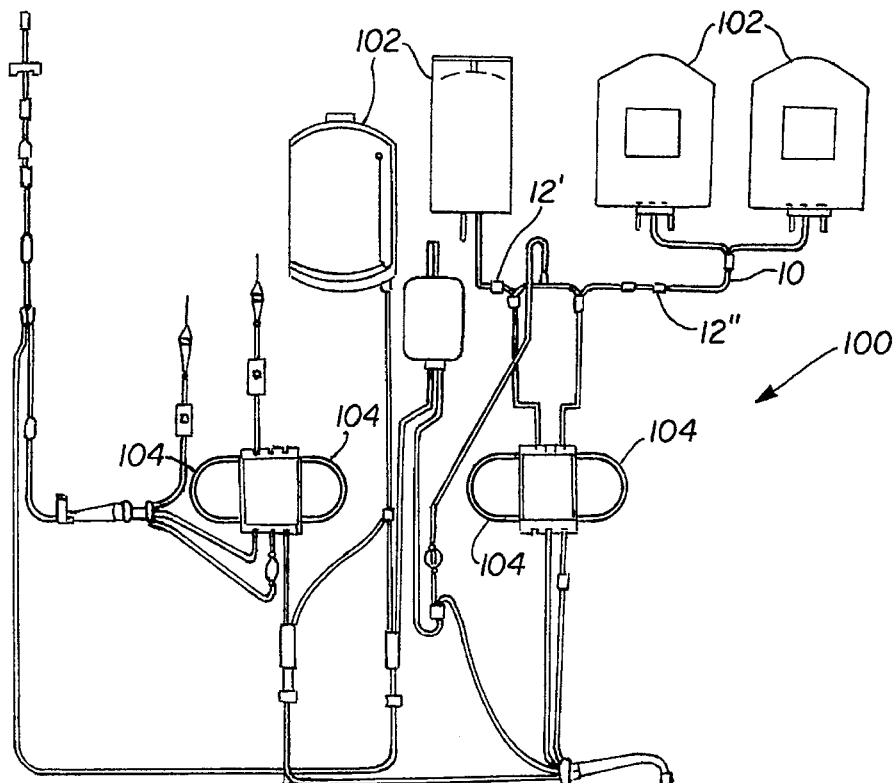
FIG. 7 is a diagrammatic illustration of a tubing set in accordance with the present invention.
Figure 8:
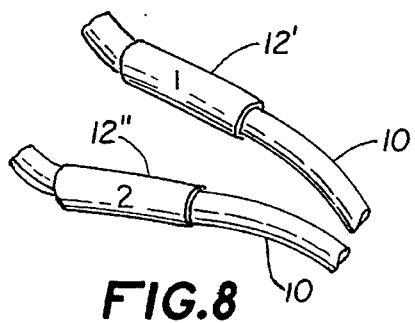
FIG. 8 is a perspective view of a portion of the tubing set of FIG. 7.
Figure 9:
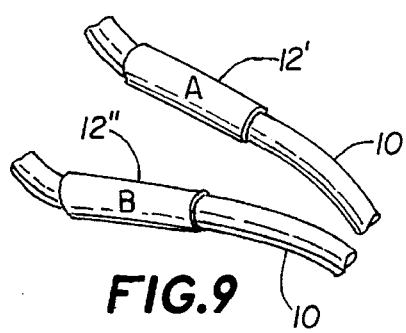
FIG. 9 is a perspective view of an alternative embodiment of the tubing set of FIG. 8.
Figure 10:
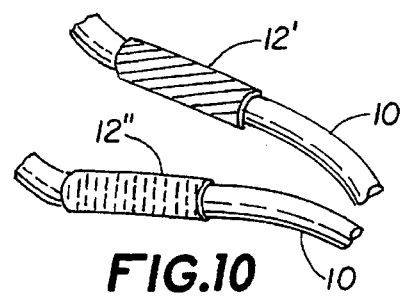
FIG. 10 is a perspective view of a further alternative embodiment of the tubing set of FIG. 8.

FIG. 1 illustrates a medical tube 10 with a tubular insulating sleeve 12 of the present invention installed thereon. The medical tube 10 is a typical flexible thermoplastic medical tube of a type commonly used for conveying biological and medical fluids such as blood and its components, saline solution or anticoagulant. The thermoplastic material of the medical tube 10 has a relatively high dielectric loss coefficient so that it is excited and heated in the presence of a radio frequency (RF) electric field. Such tubes are commonly assembled into tubing sets 100, as shown on FIG. 7, which comprise a plurality of individual lengths of medical tubes 10 assembled with other disposable components such as bags 102, reservoirs, sources of therapeutic fluids, oxygenators, dialyzers, pumps 104, etc., for use with a medical apparatus such as a blood component separation centrifuge, a dialysis apparatus or a heart/lung apparatus for use in open heart surgery. An RF tubing sealer 14 is used with the tubular insulating sleeve 12 of the present invention to seal the medical tube 10, and create a thin, easily tearable, web. The RF tubing sealer 14 may be of the type described in U.S. Pat. No. 4,013,860, issued Mar. 22, 1977 to Hosterman et al. for a "Hand Held Electro-Mechanism Sealer," and manufactured by Engineering and Research Associates, Inc., of Tucson, Ariz., as Sebra™ Model No. 2380.

The tubular insulating sleeve 12 of the present invention comprises a tube having a first end 16 and a second end 18 with an inside dimension or diameter sufficiently large that it will fit over the outside diameter of the medical tube 10. The sleeve 12 is a cylindrical tube having a circular cross sectional configuration in the presently preferred embodiment, but a tube having any cross sectional configuration, such as a square or hexagon, may also be used. It has been found that if the inside dimension of the tubular insulating sleeve 12 is sufficiently large to fit over the outside diameter of the fluid conveying tubing 10, the actual inside dimension is not critical. The tubular insulating sleeve 12 is formed of a material that has low dielectric loss coefficient so that it is not excited and heated in the presence of an RF electric field. The tubular insulating sleeve has an insulation value and wall thickness selected to retain sufficient heat in the thermoplastic material of the medical tube 10 so that when the medical tube is welded to form a seal dividing the medical tube into two segments, a thin, easily tearable, web is formed which facilitates physically separating the ends of the segments from each other while maintaining fluid tight seals on the ends of the two segments of the medical tube.

In the preferred embodiment the tubular insulating sleeve 12 is formed from a segment of polypropylene tubing having an inside diameter of 0.208 inches and a wall thickness of between 0.0055 inches and 0.0070 inches. Polypropylene tubular insulating sleeves 12 having wall thicknesses of 0.0050 and 0.0080 inches have also been successfully used. The polypropylene tubing used for forming the tubular insulating sleeves for the preferred embodiment was obtained from Sweetheart Cup Co. Inc., of Dallas, Tex. The tubular insulating sleeve 12 is preferably installed on the medical tube 10 during the manufacture of a tubing set (not shown) by slipping the tubular insulating sleeve over an end of the medical tube.

The tubular insulating sleeve 12 may optionally have a slit 20 extending through the wall of the tubular insulating sleeve and further extending from the first end 16 to the second end 18. The slit 20 may be longitudinally straight and parallel to an axis of the sleeve 12, or it may have a spiral configuration or a vee configuration. The slit 20 permits installing the tubular insulating sleeve 12 at a desired sealing location along the medical tube 10 by deforming the plastic material of the tubular insulating sleeve to spread the slit to a size at least as large as the outside diameter of the medical tube. This eliminates the necessity of sliding the tubular sleeve over an end of the medical tube 10 and permits installation of tubular insulating sleeves after a tubing set 100 is manufactured.

As shown in FIGS. 7–10, in an alternative preferred embodiment a plurality of tubular insulating sleeves 12', 12" may have sealing sequence or location information formed on each sleeve, for example a numerical (FIG. 8), alphabetical (FIG. 9) or color (FIG. 10) code to instruct an operator of the tubing sealer 14 in a predetermined sequence of sealing a plurality of medical tubes 10 of a tubing set 100.

The operation of the tubing sealer 14 in conjunction with the tubular insulating sleeve 12 of the present invention is explained in conjunction with FIGS. 2 through 5. The medical tube 10 with the tubular insulating sleeve 12 installed thereon is placed between an upper jaw 22 and a lower jaw 24 of the tubing sealer 14. The jaws are moved towards each other by a mechanism (not shown) of the tubing sealer 14 until they come into contact with the surface of the tubular insulating sleeve 12. The jaws 22 and 24 are further moved towards each other, squeezing and flattening the medical tube 10 and the tubular insulating sleeve 12. The jaws 22 and 24 compress the tubular insulating sleeve 12 and medical tube 10 until the medical tube is squeezed tight, interrupting fluid communication between a first segment 26 and a second segment 28 of the fluid conveying tubing tube 10 at a sealing location 30 between the jaws. RF energy is applied to the upper jaw and lower jaw 22 and 24, respectively, to create an electric field between the upper jaw 22 and the lower jaw 24.

The electric field established by applying RF energy to the jaws 22 and 24 causes dielectric heating and resultant melting of the thermoplastic material of the medical tube 10.

With the sides of the medical tube 10 contacting each other at the sealing location 30 the melting causes the sides to join and form a hermetic seal at the sealing location 30 permanently preventing fluid communication between the first and second segments 26 and 28, respectively. The first and the second segments 26 and 28 are physically joined by a thick web 31 of thermoplastic material.

In the absence of the tubular insulating sleeve 12, heat would be conducted from the plastic of the medical tube 10 to the jaws 22 and 24 of the tubing sealer 14 in an amount sufficient to prevent further melting of the thermoplastic material, and therefore to prevent forming a thin, easily tearable, web at the sealing location 30. With the tubular insulating sleeve 12 in place, however, sufficient heat is retained in the thermoplastic material of the medical tube 10 so that further melting occurs at the sealing location 30 as the jaws 22 and 24 are moved toward each other. This additional melting forms a thin, easily tearable, web 35 between the first segment 26 and the second segment 28, leaving a hermetic seal 32 and 34, respectively, on each end of a segment. The thin web 35 may then be manually torn to physically separate the first segment 26 from the second segment 28.

The medical tube 10 may selectively be sealed to interrupt fluid communication between the first segment 26 and the second segment 28 creating the thick web 31 instead of the thin web 35. To create the thick web 31 the radio frequency tubing sealer 14 is applied to seal the medical tube at a location on the fluid conveying tubing where there is no tubular insulating sleeve 12 installed.

Some RF tubing seal sealers 14 incorporate a timing circuit (not shown) or an impedance sensing circuit (not shown) to limit the amount of time that the electric field is applied to the thermoplastic material of the medical tube 10. For example, the Sebra™ model No. 2380 tubing sealer incorporates a timing circuit that limits the application of the RF electric field to approximately two seconds and which gives a visual indication when the time is completed. In practicing the present invention, it has been found that certain individual ones of the Sebra™ model No. 2380 tubing sealer, and other models of the tubing sealer manufactured by Sebra™, require a longer time of application of the electric field when used with the present invention. It is, therefore, advantageous to modify the timing circuit (not shown) of certain models of tubing sealers 14 to apply the electric field to the thermoplastic material of the medical tubing 10 for four seconds when the tubing sealer is used with the present invention.

FIG. 6 illustrates an alternative preferred embodiment of the present invention. In this alternative preferred embodiment an upper insulator 36 is selectively engageable on the upper jaw 22 of the tubing sealer 14 and a lower insulator 36 is selectively engageable on the lower jaw 24 of the tubing sealer 14. With the selectively engageable insulators 36 and 38 engaged on the jaws 22 and 24 of the tubing sealer 14, using the tubing sealer 14 to seal the medical tube 10 will result in sealing the medical tube and creating the thin, easily tearable, web 35 between two segments 26 and 28. When the tubing sealer 14 is used with the selectively engageable insulators 36 and 38 disengaged from the jaws 22 and 24, the tubing sealer hermetically seals against fluid communication between the tubing segments 26 and 28 and creates the thick web 31 physically connecting the segments.

In one preferred embodiment the insulators 36 and 38 are polypropylene removable insulating sleeves having the same wall thickness as the tubular insulating sleeves 12 that are selectively engaged and disengaged by sliding the sleeves on to and off of the jaws 22 and 24.

Alternatively the insulators 36 and 38 could be permanently installed on the jaws 22 and 24 (not shown) and engaged and disengaged by rotating or sliding an insulating portion of the insulators into and out of an active position. Further the insulators 36 and 38 may permanently insulate only portions of the jaws 22 and 24 (not shown), so that they are engaged when insulated portions of the jaws are used to seal the medical tube 10 and disengaged when uninsulated portions of the jaws are used to seal the medical tube. Further still, a single insulator may be selectively engaged to insulate only one of the jaws 22 or 24, with the other jaw being uninsulated.

Although described by reference to medical tubing, it will be appreciated that the present invention may be used to seal thermoplastic tubing, selectively creating a thin or a thick web, in many fields of technology.

A presently preferred embodiment of the present invention has been described with some particularity. It should be understood that this description has been made by way of preferred example and that the invention is defined by the scope of the following claims.

What is claimed is:

1. A tubing set, the tubing set including at least one fluid conveying tube for conveying a fluid, the fluid conveying tube having a predetermined outside diameter and being formed of a material adapted to being heat sealed by an application of radio frequency dielectric heating at a sealing location, further comprising:

an insulating sleeve having an inside dimension at least as large as the outside diameter of the fluid conveying tube, said tubular insulating sleeve being positioned in a substantially coaxial relationship with the fluid conveying tube at the sealing location and having a wall with a wall thickness which insulates the fluid conveying tube and permits sealing the fluid conveying tube and forming a thin, easily tearable, web by the application of the radio frequency dielectric heating.

2. A tubing set as defined in claim 1 wherein:

the insulating sleeve comprises a cylindrical sleeve formed from a sleeve material having a low dielectric loss coefficient.

3. A tubing set as defined in claim 2 wherein the sleeve material is plastic.

4. A tubing set as defined in claim 3 wherein:

the sleeve material is polypropylene.

5. A tubing set as defined in claim 4 wherein:

the wall thickness is greater than five thousandths of an inch.

6. A tubing set as defined in claim 5 wherein:

the wall thickness is less than eight thousandths of an inch.

7. A tubing set as defined in claim 4 wherein:

the wall thickness is less than eight thousandths of an inch.

8. A tubing set as defined in claim 1 wherein the tubing set comprises a plurality of the fluid conveying tubes which are to be sealed at a plurality of predetermined sealing locations in a predetermined sequence, and wherein the tubing set further comprises:

a plurality of the tubular insulating sleeves each sleeve having information thereon to indicate at least one of the predetermined locations or the predetermined sequence of sealing the fluid conveying tubes.

9. A tubing set as defined in claim 8 wherein:
the information on the insulating sleeves is a color code.

10. A tubing set as defined in claim 8 wherein:
the information formed on the insulating sleeves is a numerical code.

11. A tubing set as defined in claim 8 wherein:
the information formed on the insulating sleeves is an alphabetical code.

12. An insulating sleeve for a fluid conveying tube, the fluid conveying tube having a predetermined outside diameter and being formed of a material adapted to being heat sealed by an application of radio frequency dielectric heating at a sealing location, the insulating sleeve comprising:

a sleeve having an inside dimension at least as large as the outside diameter of the fluid conveying tube and adapted to being installed on the fluid conveying tube at the sealing location in a substantially coaxial relationship with the fluid conveying tube, said sleeve having a wall with a wall thickness which insulates the fluid conveying tube and permits sealing the fluid conveying tube and forming a thin, easily tearable, web by the application of the radio frequency dielectric heating.

13. An insulating sleeve as defined in claim 12 wherein:
the sleeve comprises a cylindrical tubular sleeve.

14. An insulating sleeve as defined in claims 12 wherein:
the sleeve is formed of a plastic material.

15. An insulating sleeve as defined in claim 14 wherein:
the plastic material is polypropylene.

16. An insulating sleeve as defined in claim 15 wherein:
the wall thickness is greater than five thousandths of an inch.

17. An insulating sleeve as defined in claim 16 wherein:
the wall thickness is less than eight thousandths of an inch.

18. An insulating sleeve as defined in claim 15 wherein:
the wall thickness is less than eight thousandths of an inch.

19. An insulating sleeve as defined in claim 12 wherein a tubing set comprises a plurality of the fluid conveying tubes which are to be sealed at a plurality of predetermined sealing locations in a predetermined sequence, and wherein the tubing set further comprises:

a plurality of the tubular sleeves each sleeve having information thereon to indicate at least one of the predetermined locations or the predetermined sequence of sealing the fluid conveying tubes.

20. An insulating sleeve as defined in claim 19 wherein:
the information on the tubular sleeves is a color code.

21. An insulating sleeve as defined in claim 19 wherein:
the information formed on the tubular sleeves is a numerical code.

22. An insulating sleeve as defined in claim 19 wherein:
the information formed on the tubular sleeves is an alphabetical code.

23. An insulating sleeve as defined in claim 12 wherein:
the tubular sleeve further comprises a first end and a second end of the sleeve; and wherein:
the sleeve defines a slit through the wall of the sleeve, said slit extending from the first end to the second end of the sleeve and having two sides which are adapted to being spread apart by deforming the tubular sleeve to permit installing the sleeve on the fluid conveying tube.

24. An insulating sleeve as defined in claim 23 wherein:
the slit is longitudinal and parallel to an axis of the tube.

* * * * *